United States Patent Office 3,083,229
Patented Mar. 26, 1963

3,083,229
PROPYNYL-HYDRAZINES
Phyllis D. Oja, Walnut Creek, Calif., assignor to The Dow Chemical Company, Midland, Mich., a corporation of Delaware
No Drawing. Filed Oct. 9, 1958, Ser. No. 766,187
3 Claims. (Cl. 260—583)

This invention is concerned with the propynyl-hydrazines of the formula

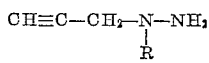

In this and succeeding formulae, R represents hydrogen or 2-propynyl. The new compounds are colorless liquids which are somewhat soluble in many organic solvents and water and form characteristic hydrazones with aldehydes and ketones. The compounds are useful as plant growth control agents, and are adapted to be employed for the control of the growth and killing of plants and for the sterilization of soil with regard to plant growth. The compounds are also useful as parasiticides and adapted to be employed for the control of bacterial, fungal and insect organism such as flies and roaches. Further, the new compounds are valuable as corrosion inhibitors and particularly useful for the inhibition of metal corrosion by acids.

The new propynylhydrazine compounds may be prepared by reacting propargyl bromide or propargyl chloride with hydrazine. The reaction is carried out in an inert organic solvent such as methanol, ethanol, isopropanol or diethyl ether. The reaction is exothermic and takes place smoothly at the temperature range of from −10° to 80° C. with the production of the desired products and hydrazine hydrohalide of reaction. Good results are obtained when employing one molecular proportion of propargyl halide with at least two molecular proportions of hydrazine. Where optimum yields of 1,1-di-(2-propynyl) hydrazine are desired, it is preferred to employ two moles of hydrazine with each mole of the propargyl halide. For optimum yields of (2-propynyl) hydrazine, one molecular proportion of propargyl halide is employed with three or four molecular proportions of hydrazine. Upon completion of the reaction, the desired product may be separated by fractional distillation under reduced pressure.

In carrying out the reaction, hydrazine is dissolved in the reaction solvent and the propargyl halide added portionwise to this solution at a temperature of from −10° to 80° C. This operation is carried out with stirring and cooling and preferably at a temperature of from 25° to 50° C. If desired, hydrazine conveniently may be employed in the form of its hydrate (N$_2$H$_4$·H$_2$O). Upon completion of the reaction, the reaction mixture may be cooled and filtered to separate hydrazine hydrohalide of reaction. The desired product is then separated by fractional distillation under reduced pressure.

The following examples illustrate the invention, and are not to be construed as limiting:

Example 1

Propargyl bromide (476 grams, 4 moles) was added dropwise to 400 grams (8.0 moles) of hydrazine hydrate dissolved in 1700 milliliters of ethanol. This operation was carried out with stirring and cooling and at a temperature of from −10° to 0° C. Following the addition, the reaction mixture was warmed to the boiling temperature and maintained at this temperature for 0.5 hour to complete the reaction. The reaction mixture was then set aside for 16 hours at room temperature. During this period, hydrazine hydrobromide precipitated in the mixture as a crystalline solid. The hydrobromide was separated by filtration and the resultant mixture fractionally distilled under reduced pressure to obtain a (2-propynyl) hydrazine product boiling at 63°–66° C. at 17 millimeters pressure and a 1,1-di-(2-propynyl) hydrazine product boiling at 61°–63° C. at 4 millimeters pressure. Carbon, nitrogen and hydrogen contents for 1,1-di-(2-propynyl) hydrazine were 66.73, 25.9 and 7.51 percent, respectively, as compared to theoretical contents of 66.6, 25.9 and 7.45 percent.

Example 2

In a similar manner, hydrazine (8 moles) in the form of its hydrate was reacted with four moles of propargyl chloride to obtain a (2-propynyl) hydrazine product boiling at 63°–65° C. at 17 millimeters pressure.

The compounds of the present invention are valuable as herbicides and may be applied to the foliage of plants to eradicate undesirable plant species. In such use the compounds may be dispersed in and on a finely divided carrier and employed as dusts. Also, the compounds may be employed in organic solvents and as constituents of aqueous dispersions and emulsions. In representative operations, good results are obtained with aqueous compositions containing twenty pounds of the hydrazine compounds per 100 gallons of ultimate mixture.

The compounds of the present invention have been found to be useful as corrosion inhibitors and particularly useful for the inhibition of the corrosion of metals by mineral acids such as hydrochloric acid. In representative operations, the compounds of the preceding examples have been found to give excellent inhibition of the corrosion of iron in 15 percent aqueous hydrochloric acid at concentrations of 0.4 percent by weight based upon the volume. The term, "propargyl-hydrazine," appearing infra, is a synonym for 2-propynyl hydrazine.

This application is a continuation-in-part of my co-pending application Serial No. 562,928, filed February 2, 1956.

I claim:
1. A propynyl hydrazine of the formula

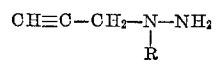

wherein R represents a member of the group consisting of hydrogen and 2-propynyl.
2. 1,1-di-(2-propynyl) hydrazine.
3. Propargyl-hydrazine.

References Cited in the file of this patent

Byrkit et al.: "Ind. and Eng. Chem.," vol. 42, page 1862 (1950). (Copy of above in Library.)
Audrieth et al.: "The Chemistry of Hydrazine," John Wiley and Sons, Inc., New York, pp. 228–229 (1951).
Diels: "Berichte Deut. Chem.," vol. 56, p. 1936 (1923).
Gabriel: "Berichte Deut. Chem.," vol. 47, page 3031 (1914). (Copies of above available U.S. Patent Office Library.)